United States Patent
Chiu et al.

(10) Patent No.: US 10,140,050 B2
(45) Date of Patent: Nov. 27, 2018

(54) PROVIDING ACCESS INFORMATION TO A STORAGE CONTROLLER TO DETERMINE A STORAGE TIER FOR STORING DATA

(71) Applicant: INTERNATIONAL BUSINESS MACHINES CORPORATION, Armonk, NY (US)

(72) Inventors: Lawrence Y. Chiu, Saratoga, CA (US); Paul H. Muench, San Jose, CA (US); Sangeetha Seshadri, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/211,963

(22) Filed: Jul. 15, 2016

(65) Prior Publication Data
US 2016/0328176 A1    Nov. 10, 2016

Related U.S. Application Data

(63) Continuation of application No. 14/600,871, filed on Jan. 20, 2015, now Pat. No. 9,477,428, which is a continuation of application No. 14/495,136, filed on Sep. 24, 2014, now Pat. No. 9,411,539.

(51) Int. Cl.
*G06F 3/06* (2006.01)
*G06F 12/14* (2006.01)

(52) U.S. Cl.
CPC ............ *G06F 3/0647* (2013.01); *G06F 3/061* (2013.01); *G06F 3/0611* (2013.01);
(Continued)

(58) Field of Classification Search
CPC .... G06F 3/0647; G06F 3/0685; G06F 3/0659; G06F 3/0611; G06F 3/0683; G06F 12/1466; G06F 2212/1052; G06F 3/061
See application file for complete search history.

(56) References Cited

U.S. PATENT DOCUMENTS

| | | | |
|---|---|---|---|
| 5,671,390 A | 9/1997 | Brady et al. | |
| 5,734,861 A | 3/1998 | Cohn et al. | |

(Continued)

FOREIGN PATENT DOCUMENTS

WO    WO2013072232 A1    5/2013

OTHER PUBLICATIONS

B. Dufrasne, Et al.; "IBM System Storage DS8000 Easy Tier Application"; IBM Corporation, Aug. 2013, pp. 48, Chapters 1-3.
(Continued)

*Primary Examiner* — David Yi
*Assistant Examiner* — Zubair Ahmed
(74) *Attorney, Agent, or Firm* — David W. Victor; Konrad Raynes Davda & Victor, LLP

(57) ABSTRACT

Provided are a computer program product, system, and method for providing access information to a storage controller to determine a storage tier for storing data. Access information is maintained for each data record in a data store, wherein the access information indicates a level of access to each data record in the data store. A write request directed to a data record in the data store is received. A command is generated identifying the data record and including the access information for the data record. The command is transmitted to the storage controller, wherein the storage controller uses the access information to determine one of the plurality of storage tiers on which to store the data record.

15 Claims, 7 Drawing Sheets

(52) U.S. Cl.
CPC .......... *G06F 3/0659* (2013.01); *G06F 3/0683* (2013.01); *G06F 3/0685* (2013.01); *G06F 12/1466* (2013.01); *G06F 2212/1052* (2013.01)

(56) References Cited

U.S. PATENT DOCUMENTS

| | | | |
|---|---|---|---|
| 6,021,509 | A | 2/2000 | Gerdt et al. |
| 6,807,558 | B1* | 10/2004 | Hassett ............. G06F 17/30867 707/999.007 |
| 8,949,563 | B2* | 2/2015 | Futawatari ............. G06F 3/061 711/162 |
| 9,459,809 | B1* | 10/2016 | Chen ..................... G06F 3/0644 |
| 2012/0005419 | A1 | 1/2012 | Wu et al. |
| 2013/0185729 | A1 | 7/2013 | Vasic et al. |
| 2013/0275656 | A1* | 10/2013 | Talagala ............. G06F 12/0246 711/103 |
| 2014/0068219 | A1 | 3/2014 | McNutt |
| 2014/0188870 | A1* | 7/2014 | Borthakur ......... G06F 17/30312 707/736 |
| 2014/0289426 | A1* | 9/2014 | Chan ........................ G06F 9/54 709/247 |
| 2014/0351515 | A1 | 11/2014 | Chiu et al. |
| 2016/0085480 | A1 | 3/2016 | Chiu et al. |
| 2016/0085696 | A1 | 3/2016 | Chiu et al. |

OTHER PUBLICATIONS

B. Dufrasne, et al.; "IBM System Storage Solutions for Smarter Systems"; IBM Corporation, Jul. 2011, pp. 262, Chapter 4.

J. Ousterhout, et al; "Beating the I/O Bottleneck: A Case for Log-Structured File Systems", Computer Science Division, Electrical Engineering and Computer Sciences, University of California at Berkley, Jan. 30, 1992, pp. 19.

B. Debnath, et al., "FlashStore: High Throughput Persistent Key-Value Store", Proceedings of the VLDB Endowment, vol. 3, No. 2, Sep. 2010, pp. 12.

J. Guerra, et al., "Cost Effective Storage Using Extent Based Dynamic Tiering", Proceedings of the USENIX conference on File Storage Technologies, USENIX Corporation, 2011, pp. 14.

"Automated Storage Tiering Product Comparison", [online] retrieved Aug. 14, 2014, pp. 3, http://www.computerweekly.com/feature/Automated-storage-tiering-pro . . . .

L. Marmol, et al., "NVMKV: a Scalable and Lightweight Flash Aware Key-Value Store", 6th USENIX workshhop on Hot Topics in Storage and File Systems, USENIX Corporation, 2014, pp. 5.

U.S. Appl. No. 13/899,371, filed May 21, 2013, entitled "Providing Data Attributes to a Storage Manager to Use to Select a Storage Tier to Use for a Data Set Management Operation" by inventors Lawrence Y. Chiu, et al.

U.S. Appl. No. 14/495,136, filed Sep. 24, 2014.

Preliminary Amendment dated Sep. 24, 2014, pp. 8, for U.S. Appl. No. 14/495,136, filed Sep. 24, 2014.

Office Action dated Dec. 24, 2015, pp. 52, for U.S. Appl. No. 14/495,136, filed Sep. 24, 2014.

Response dated Mar. 24, 2016, pp. 12, to Office Action dated Dec. 24, 2015, pp. 52, for U.S. Appl. No. 14/495,136, filed Sep. 24, 2014.

Notice of Allowance dated May 5, 2016, pp. 16, for U.S. Appl. No. 14/495,136, filed Sep. 24, 2014.

U.S. Appl. No. 14/600,871, filed Jan. 20, 2015.

List of Related Applications, pp. 2, dated Jan. 20, 2015.

Notice of Allowance dated Jul. 11, 2016, pp. 33, for U.S. Appl. No. 14/600,871, filed Jan. 20, 2015.

List of IBM Patents or Patent Applications Treated as Related, dated Jul. 15, 2016, pp. 2.

* cited by examiner

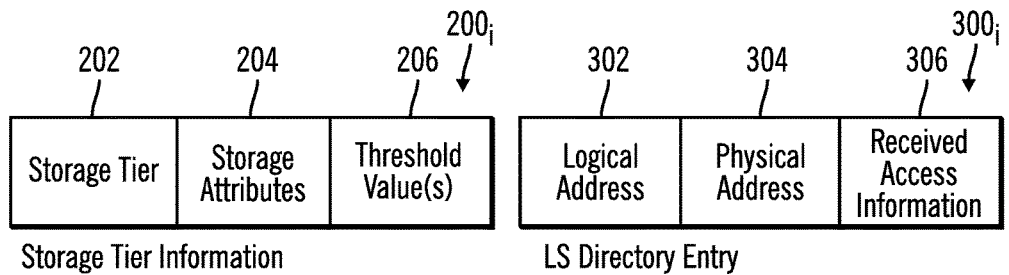
Storage Tier Information
FIG. 2
LS Directory Entry
FIG. 3
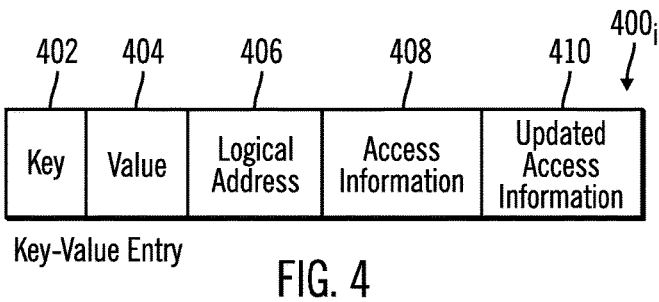
Key-Value Entry
FIG. 4
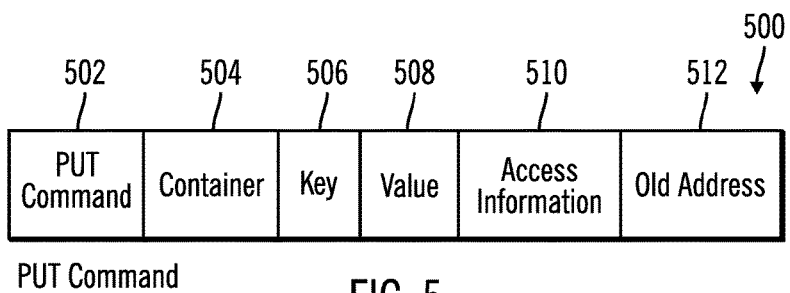
PUT Command
FIG. 5
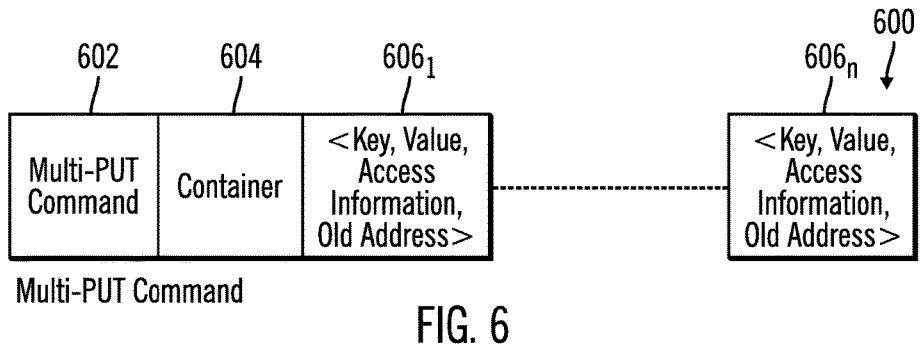
Multi-PUT Command
FIG. 6

PROVIDING ACCESS INFORMATION TO A STORAGE CONTROLLER TO DETERMINE A STORAGE TIER FOR STORING DATA

BACKGROUND OF THE INVENTION

1. Field of the Invention

The present invention relates to a computer program product, system, and method for providing access information to a storage controller to determine a storage tier for storing data.

2. Description of the Related Art

In a log structured ("LS") storage system, updates to data are not written in place, but written to a new logical and physical address. Data may be stored in a key-value store, where data is stored in unstructured records consisting of a key plus the values associated with that record. Each record has the indexed key that is unique in a namespace or set of data and one or more named bins or columns that hold the data for the record.

The LS storage system may be used to store data on solid state storage devices ("SSD"), such as flash devices. The key-value store may occasionally be subject to a process of compaction where the key-value store reorganizes the data layout in storage to be optimal for certain workloads. For instance, they key value store may reorganize data in a sorted order in order to optimize Input/Output throughput for range queries. The log structured storage system may occasionally perform garbage collection where active data, i.e., the most current version of the data, is collected and rewritten to new storage locations and physical and logical addresses having older or stale versions of data are freed to make available for subsequently received data.

Storage systems may have multiple tiers of storages so that data is stored on various types of storage devices primarily based on criteria of the access, frequency of use, security and data recovery requirements. For space and performance optimization, the data is transferred between high-cost and low-cost storage media. Such systems exist because high-speed storage devices, such as Solid State devices (SSD), Hard Disk Drive Arrays, etc., are more expensive (per byte stored) than the slower storage devices, such as optical discs and magnetic tape drives. While it would be ideal to have all data available on high-speed devices all the time, this is prohibitively expensive for many organizations. Instead, tiered systems store the bulk of the enterprise's data on slower devices, and then migrate more frequently accessed data to faster media when needed. The advantage is that the total amount of stored data can be much larger than the capacity of the active storage media available. In effect, tiered systems turn the fast storage devices into caches for the slower mass storage devices.

Storage tiering is the placement of data on different devices in the multi-tiered storage based on the type of usage, performance and capacity requirements of the data and the characteristics of the devices. Automated storage tiering programs automatically manage data placement by observing the characteristics of data in the multi-tiered storage and automatically moving the data among the different tiers of storage after observing the data for a predetermined time, such as a number of hours. Automated storage tiering decisions are based on observation of workloads or pre-set administrator policies which statically partition resources. To determine where to store data in a multi-tier storage system, a storage manager program will analyze data access patterns, workloads on the storage devices, and usage of the devices and determine the tiers and devices within tiers on which to locate data. More frequently accessed, or hot data, may be placed on faster access devices, and less frequently accessed data, or cold data, may be placed on slower access devices having a larger storage capacity.

SUMMARY

Provided are a computer program product, system, and method for providing access information to a storage controller to determine a storage tier for storing data. Access information is maintained for each data record in a data store, wherein the access information indicates a level of access to each data record in the data store. A write request directed to a data record in the data store is received. A command is generated identifying the data record and including the access information for the data record. The command is transmitted to the storage controller, wherein the storage controller uses the access information to determine one of the plurality of storage tiers on which to store the data record.

In further embodiments, a command is received including a key, a value for the key, and access information for the key, wherein the access information indicates a level of access to the value for the key in a key-value store. A determination is made of a logical address for the key and value indicated in the command. The access information for the value is used to determine one of the storage tiers onto which to store the value for the key. A determination is made of a physical address in the determined storage tier to store the value for the key in the command. The determined logical address and the determined physical address are associated and the logical address is returned in response to the command.

BRIEF DESCRIPTION OF THE DRAWINGS

FIG. 2 illustrates an embodiment of storage tier information.

FIG. 3 illustrates an embodiment of an entry in a log structured storage system.

FIG. 4 illustrates an embodiment of a storage management command.

FIGS. 5 and 6 illustrate embodiments of PUT commands to write key-values to the log structured storage system.

DETAILED DESCRIPTION

Described embodiments provide techniques for providing a storage controller access information for data to be written to storage. The storage controller uses the received access information to determine one of a plurality of storage tiers in which to store the data. Further embodiments are directed to writing values to a key-value store, where the key-value storage manager provides the storage controller the access information for a key value being written for the storage controller to use to select one of the storage tiers to store the key value being written. In further embodiments, the storage controller may write the key values to a log structured storage system in which updates to data are written to a new physical storage location in a storage tier based on the access information provided with the updated key value.

Figure 1:
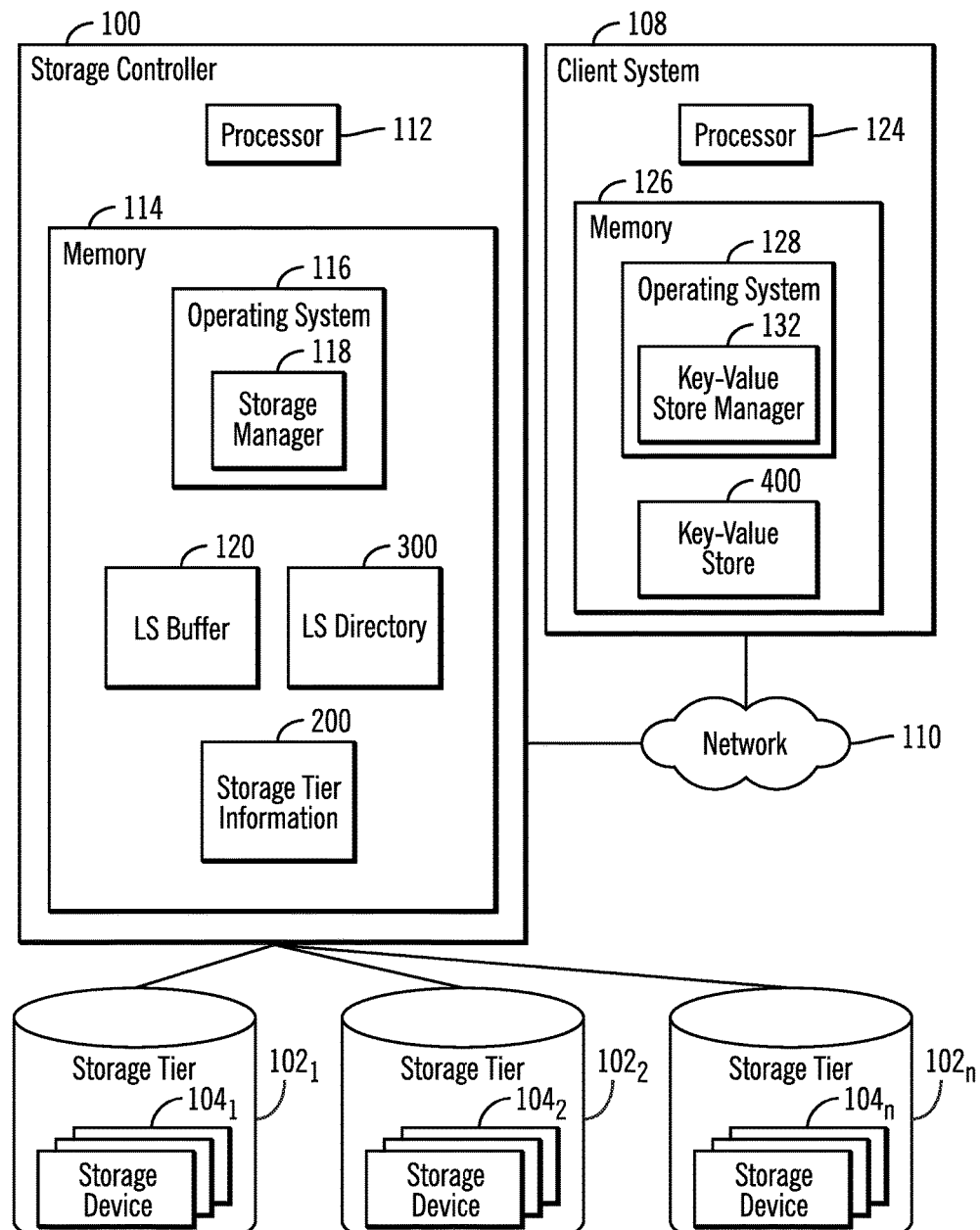
FIG. 1 illustrates an embodiment of a storage environment.

FIG. 1 illustrates a storage environment having a storage controller 100 managing the storage of data on multiple storage tiers $102_1$, $102_2$ ... $102_n$, each tier having a plurality of storage devices $104_1$, $104_2$ ... $104_n$. Each storage tier $102_1$, $102_2$ ... $102_n$ may have storage devices $104_1$, $104_2$ ... $104_n$ with storage attributes that differ from the storage attributes of other tiers, where the storage attributes may indicate a quality of service, access speed, longevity of duration of storage, type of storage, etc. A client system 108 communicates with the storage controller 100 over a bus, direct line, switch, or over a network 110.

The storage controller 100 includes a processor 112, comprising one or more processor devices and a memory 114 in which an operating system 116 is loaded to be executed by the processor 112. The operating system 116 includes a storage manager 118 to manage the storage of data in the storage tiers $102_1$, $102_2$ ... $102_n$. The storage devices $104_1$, $104_2$, ... $104_n$ may be grouped in multiple tiers based on their performance with respect to data access, where each tier has a class of slower access devices than a previous tier in a hierarchy of tiers. The arrangement of storage tiers $102_1$, $102_2$ ... $102_n$ may be based on characteristics, such as speed of their Input/Output (I/O) access profile, redundancy, etc.

In one embodiment, the first tier may comprise memory, second tier solid state storage devices (SSD), third tier hard disk drive (HDDs), and fourth tier an archival storage medium, such as tape, optical disk or slower access hard disk drives. The storage manager 118 may determine where to store data in the storage tiers $102_1$, $102_2$ ... $102_n$ based upon access information provided for the data from the client system 108.

The storage manager 118 maintains storage tier information 200 having threshold values for each storage tier $102_1$, $102_2$ ... $102_n$ that are used to determine where to store data based on access information for the data provided by the client system 108 with write data.

In one embodiment, the storage manager 118 may comprise a log structured storage system controller and maintain a log structured ("LS") buffer 120 in which write data is gathered before being written to the storage tiers $102_1$, $102_2$ ... $102_n$. An LS directory 300 includes an entry for each logical address mapping the logical address to a physical address in one of the storage tiers $102_1$, $102_2$ ... $102_n$. With a log structured storage system, updates to data are written to a new location in the storage, and a new logical address is assigned to the updated data. Updated data in the LS buffer 120 may be written to the storage tiers when the LS buffer 120 becomes full. The data for logical addresses in the LS buffer 120 may be stored in a least recently used (LRU) list, where newly received data is added to a head of the LS buffer 120 and data is removed from the tail of the data in the LS buffer 120 to store in the storage tiers $102_1$, $102_2$ ... $102_n$. In alternative embodiments, the storage manager 118 may manage data in file systems other than an LS file system, such as file systems that update data in place.

The client system 108 includes a processor 124 and a memory 126 storing programs executed by the processor 124, including an operating system 128. The operating system 128 may have a key-value storage manager 132 to manage a key-value store 400 in which data values are indexed according to a key. Applications may access the values by providing the key for the values stored for the key. The key values may comprise unstructured records indexed by the key in the key-value store 400. In alternative embodiments, the client system 108 may store data records in formats other than the key-value store format.

The network 110 may comprise a Storage Area Network (SAN), Wide Area Network (WAN), Local Area Network (LAN), the Internet, and Intranet, a wireless network, wired network, etc.

The storage devices $104_1$, $104_2$ ... $104_n$ may comprise different types or classes of storage devices, such as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The storage devices $104_1$, $104_2$ ... $104n$ may further be configured into an array of devices, such as Just a Bunch of Disks (JBOD), Direct Access Storage Device (DASD), Redundant Array of Independent Disks (RAID) array, virtualization device, etc. Further, the storage devices $104_1$, $104_2$ ... $104n$ may comprise heterogeneous storage devices from different vendors.

The memories 114 and 126 may comprise one or more volatile or non-volatile memory devices. The storage manager 118 and key-value storage manager 132 may be implemented as programs that are part of the operating systems 116, 128, respectively. Alternatively, the storage manager 118 and key-value storage manager 120 may be implemented in the same operating system or may be implemented as application code external to the operating systems 116, 128 or may be implemented with hardware logic, such as an Application Specific Integrated Circuit (ASIC), or as a programmable processor executing code in a computer readable storage medium. The storage manager 118 and 132 may be implemented in virtual machines.

FIG. 2 illustrates an instance $200_i$ of the storage tier information 200 maintained for each of the managed storage tiers $102_1$, $102_2$ ... $102_n$, including a storage tier identifier 202; storage attributes 204 of the tier 202, such as the access characteristics, quality of service level, speed, durability, cost, etc.; and one or more threshold values 206 used to determine whether data having falls within the threshold value(s) 206 of the storage tier 202 such that the data should be stored in the storage tier 202. In certain embodiments, a storage tier having faster access and higher quality of service storage devices $104_1$, $104_2$ ... $104_n$, comprising a faster access tier $102_1$, $102_2$ ... $102_n$, may have higher threshold value(s) 206 so that data associated with access information indicating a higher priority or a greater level of access are stored on a storage tier having a relatively faster access or higher quality of service. However, in certain implementations, data having a higher level of write access may be written to a storage tier $102_1$, $102_2$ ... $102_n$ having hard disk drives instead of a faster access solid state storage devices to avoid wear leveling of the solid state devices.

In one embodiment, the threshold value 206 may comprise one type of value for one type of access information, such as access statistics or priority. In a further embodiment, the threshold values 206 may provide values for different types of access information to provide selection of a storage tier based on multiple access types and/or priority levels for the data.

FIG. 3 illustrates an LS directory entry instance $300_i$ maintained for each logical address allocated in the storage controller 100, including the logical address 302; a physical address 304 in one of the storage tiers $102_1, 102_2 \ldots 102_n$ in which the data for the logical address 302 is stored; and received access information 306 comprising access information on the key-value received from the client system 108 stored at the logical 302 and physical 304 addresses. The received access information 306 may comprise access statistics, such as a number of times the key value stored at the logical address 302 was accessed, updated, read, etc., within a time window or a priority value assigned to the key value by applications accessing the key value, or some other value indicating a heat level of the data.

FIG. 4 illustrates an embodiment of an entry $400_i$ in the key-value store 400 for a key value pair, including the index key 402; a value 404 for the key, also referred to as a key value, comprising one or more fields of data; a logical address 406 assigned to the key 402 by the storage controller 100; access information 408, such as access statistics or an assigned priority for the key value 404; and updated access information 410 comprising access information being updated based on current accesses to the key value 404 within a current time window that has not yet expired. The access information 408 is reported to the storage controller 100 to use to select a storage tier $102_1, 102_2 \ldots 102_n$ in which to store the key-value 404. After a time window expires, the access information 408 is set to the updated access information 410. In this way, the access information 408 reported to the storage controller 100 to use does not abruptly change according to most current accesses, which may not reflect a longer term access pattern of the key value. Instead, the access information 408 that is reported is updated with newly calculated updated access information 410 after the time window has expired to reflect changes over a period of time, such as hours, a day, etc.

FIG. 5 illustrates an embodiment of a PUT command 500 the key-value store manager 132 sends to the storage controller 100 to store as an updated key value, including a PUT command code 502 indicating that a single key value is provided; a container 504 or storage array in which the key-value is stored; the key 506 of the key value to store; the value 508; the access information 510 for the key value, such as access information 408 in the key-value store 408; and an old address 512, e.g., logical address, at which the previous version of the data is stored.

FIG. 6 illustrates an embodiment of a multi-PUT command 600 the key-value storage manager 132 uses to transmit multiple key values in one command, and includes a multi-PUT command code 600 indicating that multiple key values are being transferred; a container 602 or storage array in which the key value is stored; and multiple instances of key, value, access information, and old address $606i \ldots 606_n$ for each of the n key-values to write to the storage controller 100.

The commands used to include the information in FIGS. 5 and 6 may comprise command types other than a PUT command.

Figure 7:
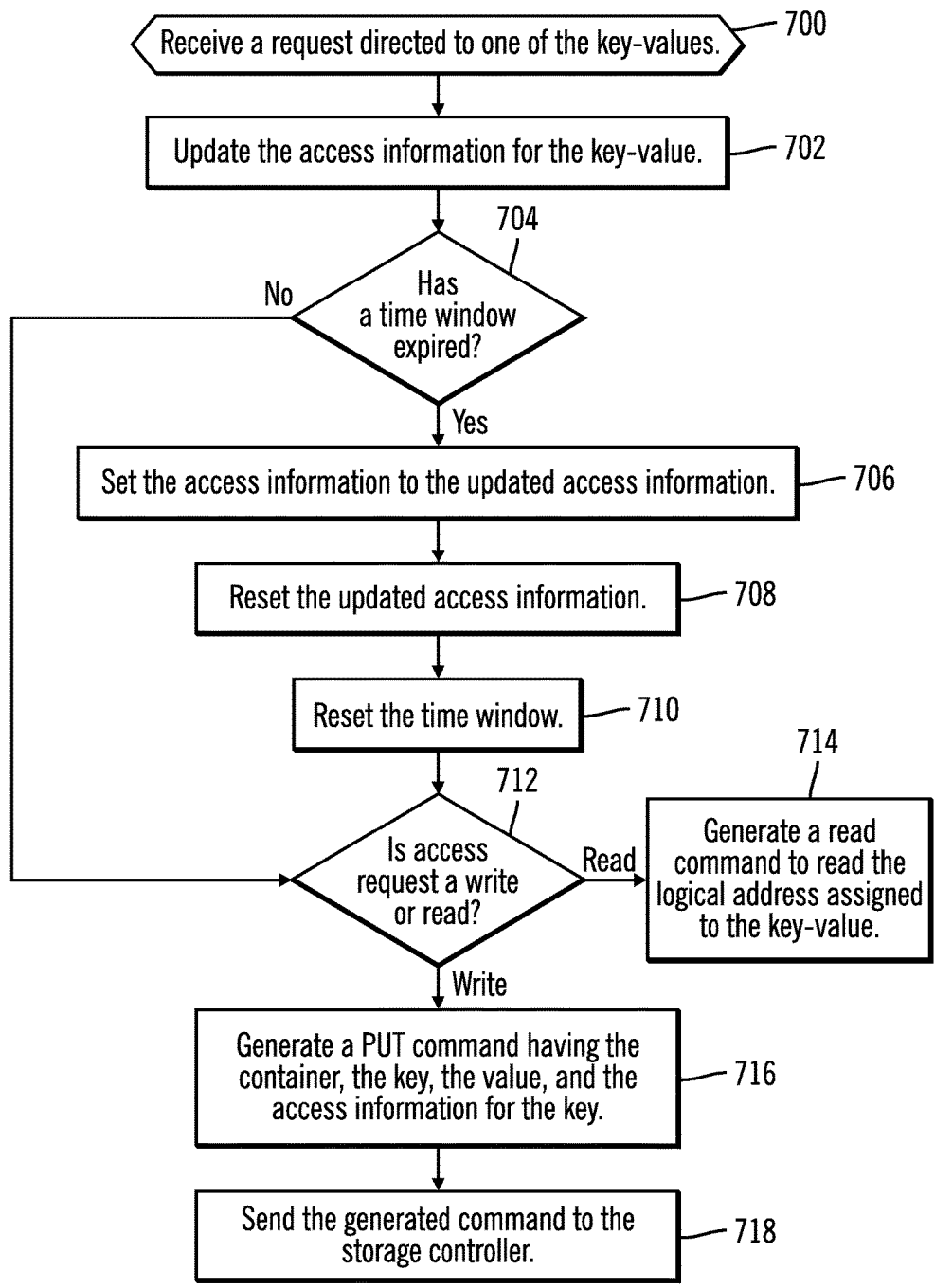
FIG. 7 illustrates an embodiment of operations to process a request directed to a key value in the key-value store.

FIG. 7 illustrates an embodiment of operations performed by the key-value storage manager 132 to process an access request, read or write, to one of the key values in the key-value store 400. Upon receiving (at block 700) the access request to a key-value, the key-value storage manager 132 may update (at block 702) the access information 410 for the key 402 in the key value entry $400_i$. If the access information comprises an access count, then that count may be incremented, if a priority, then the priority may be updated with a priority included in the write request, etc. If (at block 704) the time window for updating access information 408 has expired, then the access information 408 is set (at block 706) to the updated access information 410 and the updated access information (at bock 708) is reset. The time window may also be reset (at block 710).

After updating the access information 408 to the updated access information 410 or if (at block 704) the time window has not expired, the access request may be processed. If (at block 712) the access request is a read, then the key-value storage manager 132 generates (at block 714) a read command to send to the storage controller 100 to read the logical address 406 assigned to the key 402. If (at block 714) the access request is a write having updated data for the key-value, then the key-value storage manage 132 generates (at block 716) a PUT command 500 indicating the container 504, key 506, the updated value 508 and the access information 510 for the key as indicated in the key-value entry $400_i$ for the key. The generated PUT command 500 is sent (at block 718) to the storage controller 100.

In an alternative embodiment, the key-value storage manager 132 may buffer updates for multiple key values and then use the multi-PUT command to send the updated key values to the storage controller 100 in a single command.

Figure 8:
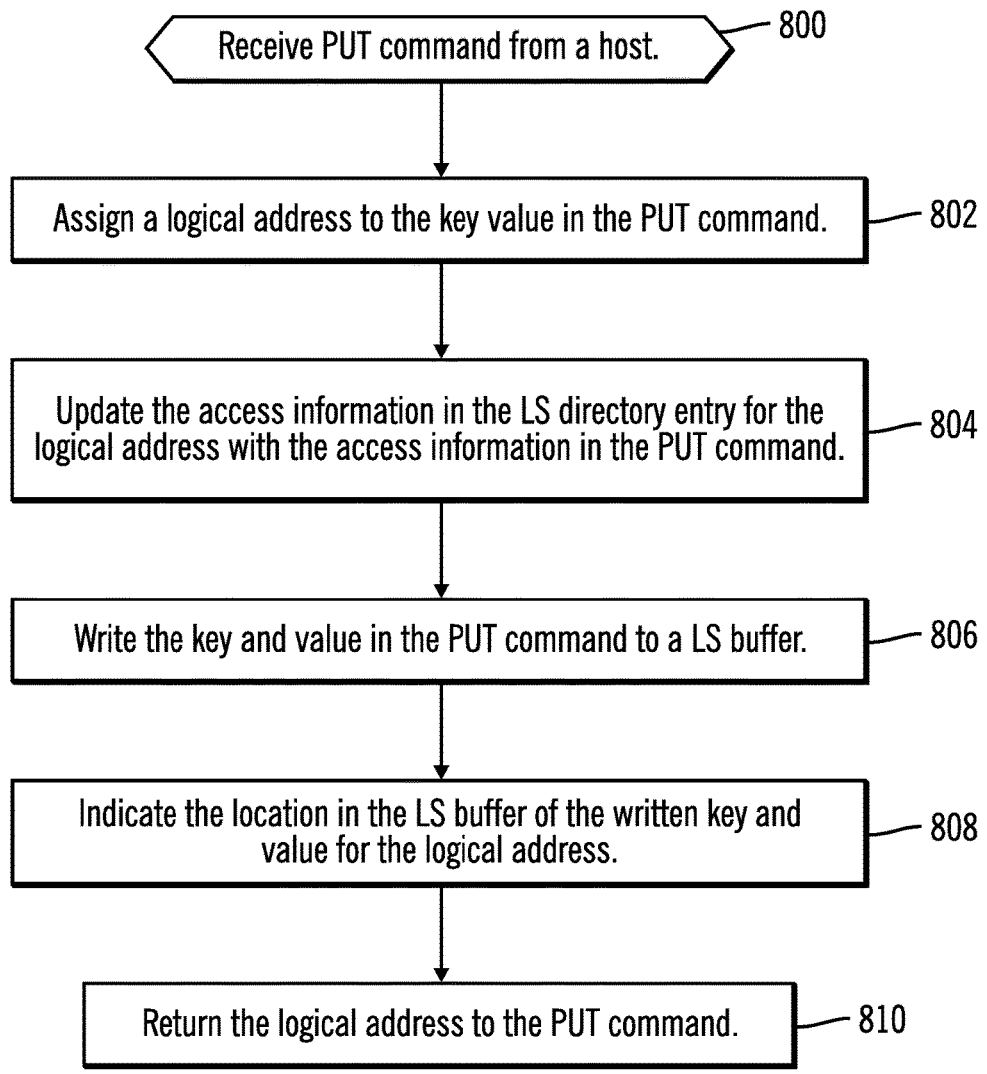
FIG. 8 illustrates an embodiment of operations to process a PUT command having a key value to write.

FIG. 8 illustrates an embodiment of operations performed by the storage manager 118 to process the PUT command 500 to write a key value. Upon receiving (at block 800) the PUT command 500, the storage manager 118, which may comprise an LS manager, assigns (at block 802) an available logical address to the key value. The storage manager 118 updates (at block 804) the access information 306 in the LS directory 300 entry $300_i$ for the logical address 302 with the access information 510 in the PUT command 500. The key 506 and value 508 in the received PUT command 500 are written (at block 804) to the LS buffer 120, such as at the head of a circular buffer having a most recently used of the key-values. The location in the LS buffer 120 of the written key and value for the logical address is indicated (at block 808) in the physical address 304 of the LS directory entry $300_i$ for the logical address. The assigned logical address is returned (at block 810) to the key-value storage manager 132 which initiated the PUT command 500.

Figure 9:
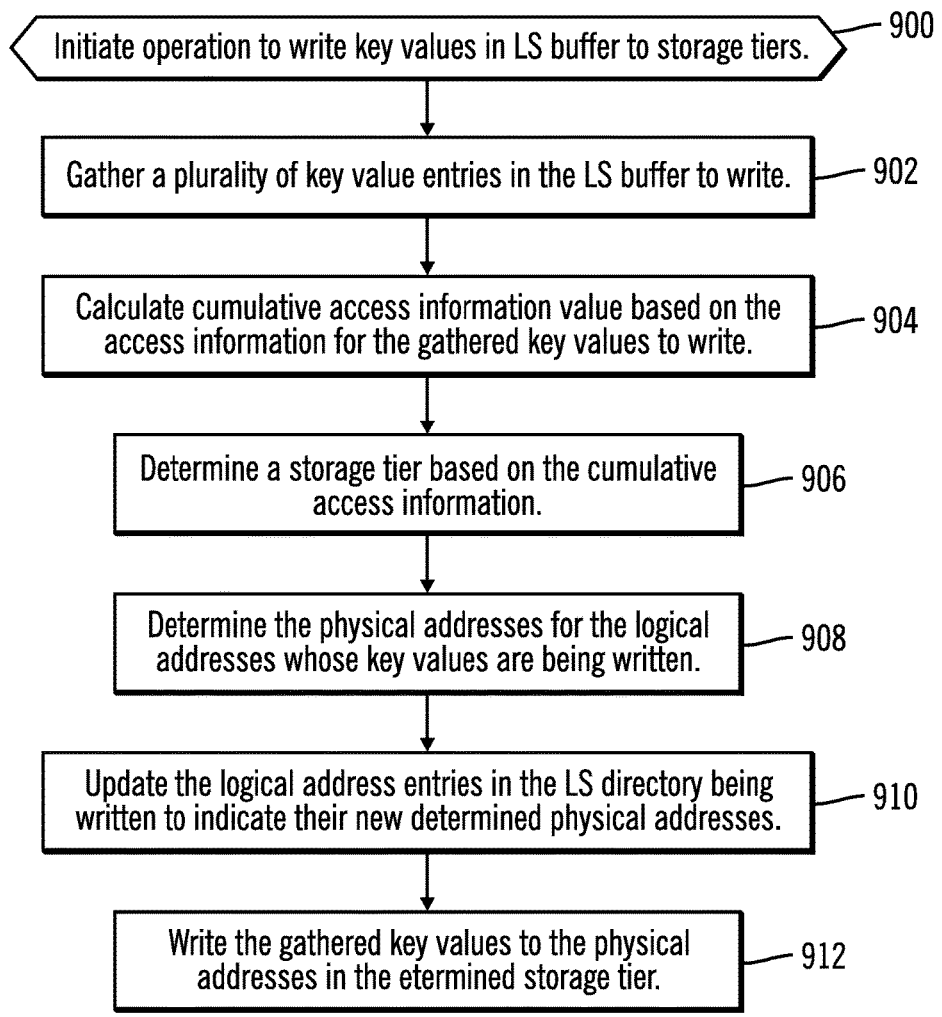
FIG. 9 illustrates an embodiment of operations to write key values in a buffer to storage.

FIG. 9 illustrates an embodiment of operations performed by the storage manager 118 to write key values in the LS buffer 120 to one of the storage tiers $102_1, 102_2 \ldots 102_n$, such as when the LS buffer 120 is full or close to full, and LRU key-values need to be written to storage to make room for new data. Upon initiating (at block 900) the write operation, the storage manager 118 gathers (at block 902) a plurality of key values for logical addresses in the LS buffer 120 to write. A cumulative access information value is calculated (at block 904) based on the access information 306 for the key values gathered to write. If the access information 306 comprises a count of a number of accesses, then the cumulative access information value may comprise a sum of the counts, an average or any other calculated composite value. If the access information 306 comprises a priority, then the calculated cumulative access information may comprise an average or mean of the priorities for the logical addresses gathered to write.

The storage manager 118 may then determine (at block 906) one of the storage tiers based on the cumulative access information falling within the one or more threshold values assigned to the storage tiers $102_1, 102_2 \ldots 102_n$. A faster access storage tier may be selected for cumulative access information values having a higher amount, so that more frequently accessed data is stored in a faster access profile storage tier. The storage manager 118 may use the old address 512 information to determine a tier different form the current tier having the old address 512 of the data at which to store the data so as to change the storage of the data. This old address 512 information is used to decrease the heat of already written data to make the data placement more reactive to move the data to a different storage device in a different tier in order to remove the heat, i.e., I/O activity, at the old address. However, in certain implementations, cumulative access information values indicating a higher level of write access may be written to a storage tier $102_1, 102_2 \ldots 102_n$ having hard disk drives instead of solid state storage devices to avoid wear leveling of the solid state devices. The physical addresses for the logical addresses whose key values are being written are determined (at block 908) and the entries $300_i$ for the logical addresses in the LS directory being written are updated (at block 910) to indicate the determined physical addresses for the logical addresses. The storage manager 118 may select consecutive physical addresses in the determined storage tier $102_1, 102_2 \ldots 102_n$ for writing the gathered key values to optimize access. The storage manager 118 writes (at block 912) the gathered key values to the physical addresses in the determined storage tiers $102_1, 102_2 \ldots 102_n$.

In an alternative embodiment, the storage manager 118 may write a key value without waiting to gather multiple key-values from the LS buffer 120 to write at once. In such case, the storage manager 118 uses the access information 510 in the single PUT command 500 to determine a storage tier $102_1, 102_2 \ldots 102_n$ to store the data.

Figure 10:
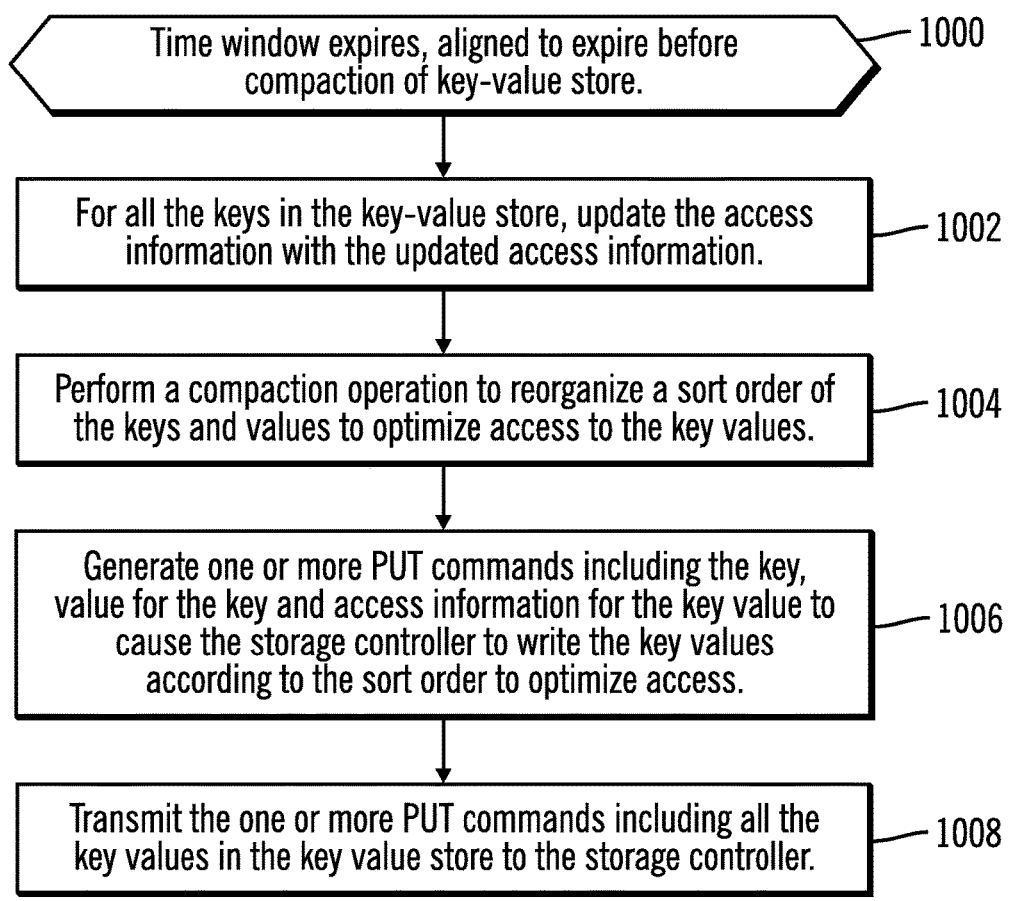
FIG. 10 illustrates an embodiment of operations to update access information and perform compaction of a key-value store.

FIG. 10 illustrates operations performed by the key-value storage manager 132 to update the access information 408 with the updated access information 410 after a time window has expired. The time window may be aligned to expire before a compaction operation to reorganize an order of the key-values in the key-value store 400 according to a sort order that specifies a reorganization of an order in which the key values are stored. By so aligning the time window to occur before the compaction window, the reorganized key values can be sent with the most current access information 408 so that the storage controller 118 writes the key values to contiguous storage locations in storage tiers $102_1, 102_2 \ldots 102_n$ selected according to the most current access information. Upon the time window expiring (at block 1000), the key-value storage manager 132 updates (at block 1002) the access information 408 with the updated access information 410 for all the keys 402 in the key-value store 400. The key-value storage manager 132 then performs (at block 1004) a compaction operation, upon expiration of a compaction window, aligned with the time window, to reorganize an order in which the key values are stored in the key-value store 400. The storage manager 118 may generate (at block 1006) one or more PUT commands 500, 600 including the key values 404 for the key 402s and access information 408 for all the key values in the key-value storage 400 to cause the storage controller 118 to write the key values according to the reorganization sort order to optimize access. The key-value storage manager 132 transmits (at block 1008) the one or more PUT commands having updated access information 408 for all the key values 404 in the key-value store 400 to cause the storage manager 118 to write all the gathered key values to consecutive physical addresses in a storage tier $102_1, 102_2 \ldots 102_n$ corresponding to the sot order used during the compaction process. In one embodiment, the access information 410 for all the keys may be sent in one or more PUT 500 and multi-PUT 600 commands.

Upon receiving the one or more PUT commands 500, 600 with all the key values to write to reorganize the order in which they key values are written, the storage manager 118 may perform the operations in FIG. 8 to assign logical and physical addresses for the key values in the PUT command 500, 600 to reorganize the key values in the storage tiers $102_1, 102_2 \ldots 102_n$.

Described embodiments provide techniques for a client system to provide access information to a storage controller for the storage controller to use to select a storage tier in which the data provided by the client system will be stored. In logical storage (LS) system embodiments, the client system may gather access information, such as access statistics, for key-values in a key value store, and send that access information to the storage manager 118 to use when selecting a storage tier to use to store the key values.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
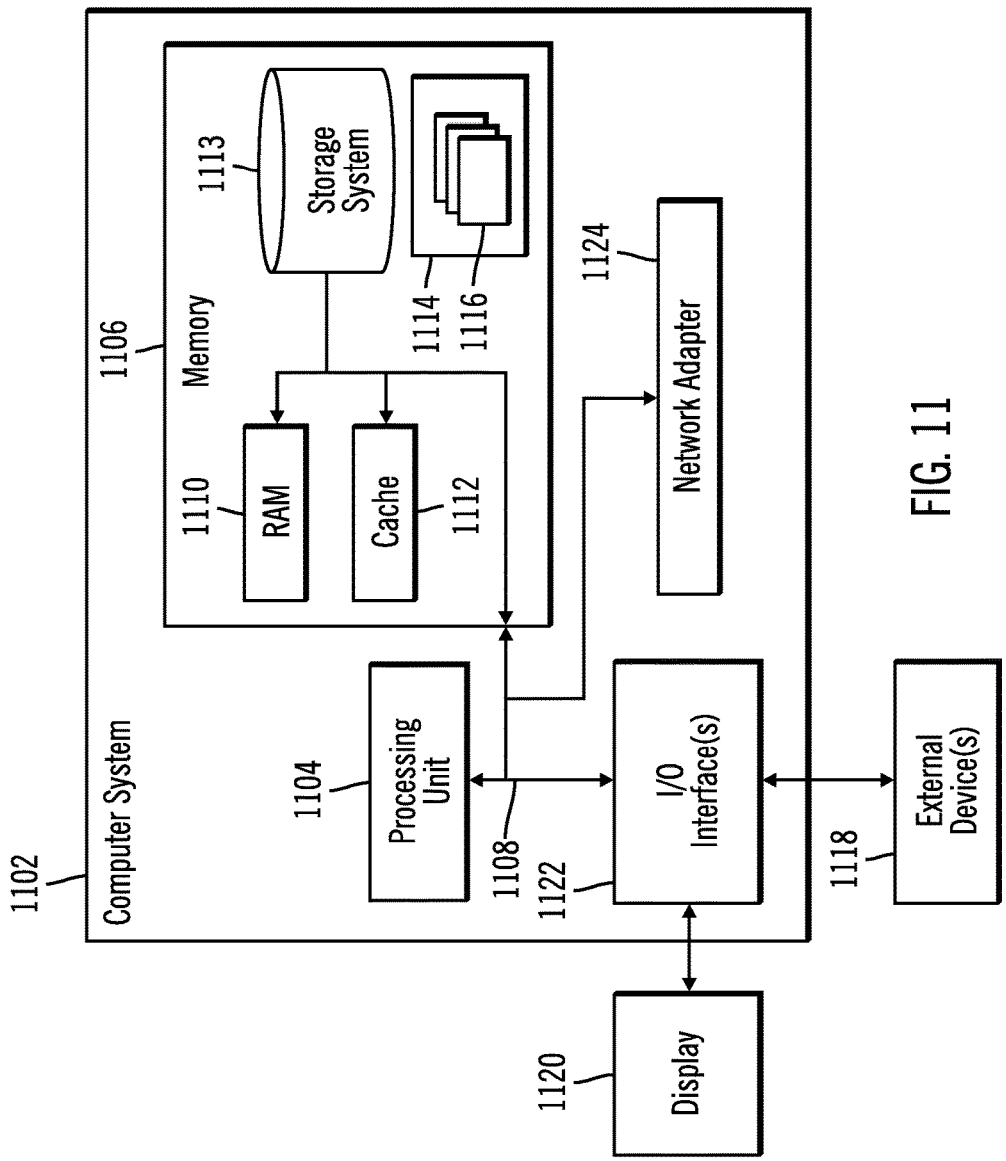
FIG. 11 illustrates an embodiment of a computer architecture used with described embodiments.

The storage controller 100 and client system 108, and components therein, may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular resources or implement particular abstract data types. Computer system/server 1102 may be practiced in distributed cloud computing environments where resources are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 1116 which generally carry out the functions and/or methodologies of embodiments of the invention as described herein.

Computer system/server 1102 may also communicate with one or more external devices 1118 such as a keyboard, a pointing device, a display 1120, etc.; one or more devices that enable a user to interact with computer system/server 12; and/or any devices (e.g., network card, modem, etc.) that enable computer system/server 1102 to communicate with one or more other computing devices. Such communication can occur via Input/output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data at a client system and in communication with a storage controller managing data access to a plurality of storage tiers, the computer program product comprising a computer readable storage medium having computer readable program code embodied therein that executes in the client system to perform operations, the operations comprising:
   maintaining access information at the client system for each data record in a data store at the client system, wherein the access information indicates a level of access to each data record in the data store;
   receiving a write request directed to a data record in the data store;
   generating a command identifying the data record to cause the data record to be written by the storage controller and including the access information for the data record and an old address at which the data was previously written; and
   transmitting the command to the storage controller, wherein the storage controller uses the access information to determine one of the plurality of storage tiers on which to store the data record that is different from the storage tier including the old address included in the command.

2. The computer program product of claim 1, wherein the operations further comprise:
   updating the access information based on access requests directed to the data record, wherein the access information indicates a measurement of access to the data record.

3. The computer program product of claim 1, wherein the operations further comprise:
   updating an updated access information for a data record in response to receiving an access request directed to the data record; and
   setting the access information for the data record to the updated access information for the data record in response to expiration of a time window.

4. The computer program product of claim 1, wherein the data store comprises a key-value data store and wherein there is a separate key for each data record, and wherein the data record comprises a value for a key, wherein the command indicates the key, the value for the key, and the access information for the key.

5. The computer program product of claim 4, wherein the command comprises a PUT command to cause the storage controller to write a key-value to a log structured storage system, wherein the operations further comprise:
   receiving, from the storage controller, a logical address for the key-value included in the PUT command; and
   associating the received logical address with the key-value indicated in the PUT command in the key-value data store.

6. A system for managing data and in communication with a storage controller managing data access to a plurality of storage tiers, comprising:
   a data store;
   a processor; and
   a computer readable storage medium having computer readable program code embodied therein that when executed by the processor performs operations, the operations comprising:
      maintaining access information for each data record in the data store at the system, wherein the access information indicates a level of access to each data record in the data store;
      receiving a write request directed to a data record in the data store;
      generating a command identifying the data record to cause the data record to be written by the storage controller and including the access information for the data record and an old address at which the data was previously written; and
      transmitting the command to the storage controller, wherein the storage controller uses the access information to determine one of the plurality of storage tiers on which to store the data record external to the data store that is different from the storage tier including the old address included in the command.

7. The system of claim 6, wherein the operations further comprise:
   updating the access information based on access requests directed to the data record, wherein the access information indicates a measurement of access to the data record.

8. The system of claim 6, wherein the operations further comprise:
   updating an updated access information for a data record in response to receiving an access request directed to the data record; and
   setting the access information for the data record to the updated access information for the data record in response to expiration of a time window.

9. The system of claim 6, wherein the data store comprises a key-value data store and wherein there is a separate key for each data record, and wherein the data record comprises a value for a key, wherein the command indicates the key, the value for the key, and the access information for the key.

10. The system of claim 9, wherein the command comprises a PUT command to cause the storage controller to write a key-value to a log structured storage system, wherein the operations further comprise:
    receiving, from the storage controller, a logical address for the key-value included in the PUT command; and
    associating the received logical address with the key-value indicated in the PUT command in the key-value data store.

11. A method for managing data in a client system in communication with a storage controller managing data access to a plurality of storage tiers, comprising:
    maintaining access information for each data record in a data store at the client system, wherein the access information indicates a level of access to each data record in the data store;
    receiving a write request directed to a data record in the data store;
    generating a command identifying the data record to cause the data record to be written by the storage controller and including the access information for the data record and an old address at which the data was previously written; and
    transmitting the command to the storage controller, wherein the storage controller uses the access information to determine one of the plurality of storage tiers on which to store the data record that is different from the storage tier including the old address included in the command.

12. The method of claim 11, further comprising:
    updating the access information based on access requests directed to the data record, wherein the access information indicates a measurement of access to the data record.

13. The method of claim 11, further comprising:
    updating an updated access information for a data record in response to receiving an access request directed to the data record; and
    setting the access information for the data record to the updated access information for the data record in response to expiration of a time window.

14. The method of claim 11, wherein the data store comprises a key-value data store and wherein there is a separate key for each data record, and wherein the data record comprises a value for a key, wherein the command indicates the key, the value for the key, and the access information for the key.

15. The method of claim 14, wherein the command comprises a PUT command to cause the storage controller to write a key-value to a log structured storage system, wherein further comprising:
    receiving, from the storage controller, a logical address for the key-value included in the PUT command; and
    associating the received logical address with the key-value indicated in the PUT command in the key-value data store.

* * * * *